United States Patent [19]

Ishida

[11] Patent Number: 5,504,697
[45] Date of Patent: Apr. 2, 1996

[54] LIMITER CIRCUIT PRODUCING DATA BY USE OF COMPARISON IN EFFECTIVE DIGIT NUMBER OF DATA

[75] Inventor: Hideo Ishida, Tokyo, Japan

[73] Assignee: NEC Corporation, Tokyo, Japan

[21] Appl. No.: 360,359

[22] Filed: Dec. 21, 1994

[30] Foreign Application Priority Data

Dec. 27, 1993 [JP] Japan ................................. 5-346988

[51] Int. Cl.⁶ .............................. G06F 7/00; G06F 11/00; G06F 7/38
[52] U.S. Cl. .................. 364/745; 364/715.1; 364/737
[58] Field of Search ................... 364/715.04, 715.06, 364/715.1, 736, 736.5, 737, 745

[56] References Cited

U.S. PATENT DOCUMENTS

| 4,817,047 | 3/1989 | Nishitani et al. ......................... 364/754 |
| 4,941,119 | 7/1990 | Moline . | |
| 4,945,507 | 7/1990 | Ishida et al. ............................ 364/737 |
| 5,164,914 | 11/1992 | Anderson ................................. 364/745 |
| 5,251,166 | 10/1993 | Ishida .................................... 364/746.2 |
| 5,422,805 | 6/1995 | McIntyre et al. ........................ 364/757 |

FOREIGN PATENT DOCUMENTS

0112982A3  5/1983  European Pat. Off. .
60-220402  11/1985  Japan .

Primary Examiner—Roy N. Envall, Jr.
Assistant Examiner—Chuong D. Ngo
Attorney, Agent, or Firm—Whitham, Curtis, Whitham & McGinn

[57] ABSTRACT

Disclosed herein is a limiter circuit for limiting an output data to a limit value when an input data exceeds in value the limit value. The limiter circuit includes an encoder responding to the input data and producing a first data indicative of an effective digit number of the value of the input data, a comparator comparing the first data with a second data indicative of an effective digit number of the limit value, and a decoder responding to the second data and producing a third data indicative of the limit value. One of the input data and the third data is selected and outputted as the output data through a selector responding to a comparison output of the comparator.

5 Claims, 15 Drawing Sheets

INPUT / OUTPUT RELATIONSHIP OF
FIRST PRIORITY ENCODER 304

| | | | | | | INPUT BIT | | | | | | | | | | | | OUTPUT BIT | | |
|---|---|---|---|---|---|---|---|---|---|---|---|---|---|---|---|---|---|---|---|
| I15 | I14 | I13 | I12 | I11 | I10 | I9 | I8 | I7 | I6 | I5 | I4 | I3 | I2 | I1 | I0 | Q3 | Q2 | Q1 | Q0 |
| 1 | x | x | x | x | x | x | x | x | x | x | x | x | x | x | x | 0 | 0 | 0 | 0 |
| 0 | 1 | x | x | x | x | x | x | x | x | x | x | x | x | x | x | 1 | 1 | 1 | 1 |
| 0 | 0 | 1 | x | x | x | x | x | x | x | x | x | x | x | x | x | 1 | 1 | 1 | 0 |
| 0 | 0 | 0 | 1 | x | x | x | x | x | x | x | x | x | x | x | x | 1 | 1 | 0 | 1 |
| 0 | 0 | 0 | 0 | 1 | x | x | x | x | x | x | x | x | x | x | x | 1 | 1 | 0 | 0 |
| 0 | 0 | 0 | 0 | 0 | 1 | x | x | x | x | x | x | x | x | x | x | 1 | 0 | 1 | 1 |
| 0 | 0 | 0 | 0 | 0 | 0 | 1 | x | x | x | x | x | x | x | x | x | 1 | 0 | 1 | 0 |
| 0 | 0 | 0 | 0 | 0 | 0 | 0 | 1 | x | x | x | x | x | x | x | x | 1 | 0 | 0 | 1 |
| 0 | 0 | 0 | 0 | 0 | 0 | 0 | 0 | 1 | x | x | x | x | x | x | x | 1 | 0 | 0 | 0 |
| 0 | 0 | 0 | 0 | 0 | 0 | 0 | 0 | 0 | 1 | x | x | x | x | x | x | 0 | 1 | 1 | 1 |
| 0 | 0 | 0 | 0 | 0 | 0 | 0 | 0 | 0 | 0 | 1 | x | x | x | x | x | 0 | 1 | 1 | 0 |
| 0 | 0 | 0 | 0 | 0 | 0 | 0 | 0 | 0 | 0 | 0 | 1 | x | x | x | x | 0 | 1 | 0 | 1 |
| 0 | 0 | 0 | 0 | 0 | 0 | 0 | 0 | 0 | 0 | 0 | 0 | 1 | x | x | x | 0 | 1 | 0 | 0 |
| 0 | 0 | 0 | 0 | 0 | 0 | 0 | 0 | 0 | 0 | 0 | 0 | 0 | 1 | x | x | 0 | 0 | 1 | 1 |
| 0 | 0 | 0 | 0 | 0 | 0 | 0 | 0 | 0 | 0 | 0 | 0 | 0 | 0 | 1 | x | 0 | 0 | 1 | 0 |
| 0 | 0 | 0 | 0 | 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 0 |

INPUT / OUTPUT RELATIONSHIP OF
SECOND PRIORITY ENCODER 305

| INPUT BIT | | | | | | | | | | | | | | | | OUTPUT BIT | | | |
|---|---|---|---|---|---|---|---|---|---|---|---|---|---|---|---|---|---|---|---|
| I15 | I14 | I13 | I12 | I11 | I10 | I9 | I8 | I7 | I6 | I5 | I4 | I3 | I2 | I1 | I0 | Q3 | Q2 | Q1 | Q0 |
| 0 | x | x | x | x | x | x | x | x | x | x | x | x | x | x | x | 0 | 0 | 0 | 0 |
| 1 | 0 | x | x | x | x | x | x | x | x | x | x | x | x | x | x | 1 | 1 | 1 | 1 |
| 1 | 1 | 0 | x | x | x | x | x | x | x | x | x | x | x | x | x | 1 | 1 | 1 | 0 |
| 1 | 1 | 1 | 0 | x | x | x | x | x | x | x | x | x | x | x | x | 1 | 1 | 0 | 1 |
| 1 | 1 | 1 | 1 | 0 | x | x | x | x | x | x | x | x | x | x | x | 1 | 1 | 0 | 0 |
| 1 | 1 | 1 | 1 | 1 | 0 | x | x | x | x | x | x | x | x | x | x | 1 | 0 | 1 | 1 |
| 1 | 1 | 1 | 1 | 1 | 1 | 0 | x | x | x | x | x | x | x | x | x | 1 | 0 | 1 | 0 |
| 1 | 1 | 1 | 1 | 1 | 1 | 1 | 0 | x | x | x | x | x | x | x | x | 1 | 0 | 0 | 1 |
| 1 | 1 | 1 | 1 | 1 | 1 | 1 | 1 | 0 | x | x | x | x | x | x | x | 1 | 0 | 0 | 0 |
| 1 | 1 | 1 | 1 | 1 | 1 | 1 | 1 | 1 | 0 | x | x | x | x | x | x | 0 | 1 | 1 | 1 |
| 1 | 1 | 1 | 1 | 1 | 1 | 1 | 1 | 1 | 1 | 0 | x | x | x | x | x | 0 | 1 | 1 | 0 |
| 1 | 1 | 1 | 1 | 1 | 1 | 1 | 1 | 1 | 1 | 1 | 0 | x | x | x | x | 0 | 1 | 0 | 1 |
| 1 | 1 | 1 | 1 | 1 | 1 | 1 | 1 | 1 | 1 | 1 | 1 | 0 | x | x | x | 0 | 1 | 0 | 0 |
| 1 | 1 | 1 | 1 | 1 | 1 | 1 | 1 | 1 | 1 | 1 | 1 | 1 | 0 | x | x | 0 | 0 | 1 | 1 |
| 1 | 1 | 1 | 1 | 1 | 1 | 1 | 1 | 1 | 1 | 1 | 1 | 1 | 1 | 0 | x | 0 | 0 | 1 | 0 |
| 1 | 1 | 1 | 1 | 1 | 1 | 1 | 1 | 1 | 1 | 1 | 1 | 1 | 1 | 1 | 0 | 0 | 0 | 0 | 1 |
| 1 | 1 | 1 | 1 | 1 | 1 | 1 | 1 | 1 | 1 | 1 | 1 | 1 | 1 | 1 | 1 | 0 | 0 | 0 | 1 |

INPUT / OUTPUT RELATIONSHIP
OF FIRST DECODER 302

| INPUT BIT | | | | OUTPUT BIT | | | | | | | | | | | | | | | |
|---|---|---|---|---|---|---|---|---|---|---|---|---|---|---|---|---|---|---|---|
| I3 | I2 | I1 | I0 | Q15 | Q14 | Q13 | Q12 | Q11 | Q10 | Q9 | Q8 | Q7 | Q6 | Q5 | Q4 | Q3 | Q2 | Q1 | Q0 |
| 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 1 | 1 | 1 | 1 | 1 | 1 | 1 | 1 | 1 | 1 | 1 | 1 | 1 | 1 | 1 |
| 1 | 1 | 1 | 0 | 0 | 0 | 1 | 1 | 1 | 1 | 1 | 1 | 1 | 1 | 1 | 1 | 1 | 1 | 1 | 1 |
| 1 | 1 | 0 | 1 | 0 | 0 | 0 | 1 | 1 | 1 | 1 | 1 | 1 | 1 | 1 | 1 | 1 | 1 | 1 | 1 |
| 1 | 1 | 0 | 0 | 0 | 0 | 0 | 0 | 1 | 1 | 1 | 1 | 1 | 1 | 1 | 1 | 1 | 1 | 1 | 1 |
| 1 | 0 | 1 | 1 | 0 | 0 | 0 | 0 | 0 | 1 | 1 | 1 | 1 | 1 | 1 | 1 | 1 | 1 | 1 | 1 |
| 1 | 0 | 1 | 0 | 0 | 0 | 0 | 0 | 0 | 0 | 1 | 1 | 1 | 1 | 1 | 1 | 1 | 1 | 1 | 1 |
| 1 | 0 | 0 | 1 | 0 | 0 | 0 | 0 | 0 | 0 | 0 | 1 | 1 | 1 | 1 | 1 | 1 | 1 | 1 | 1 |
| 1 | 0 | 0 | 0 | 0 | 0 | 0 | 0 | 0 | 0 | 0 | 0 | 1 | 1 | 1 | 1 | 1 | 1 | 1 | 1 |
| 0 | 1 | 1 | 1 | 0 | 0 | 0 | 0 | 0 | 0 | 0 | 0 | 0 | 1 | 1 | 1 | 1 | 1 | 1 | 1 |
| 0 | 1 | 1 | 0 | 0 | 0 | 0 | 0 | 0 | 0 | 0 | 0 | 0 | 0 | 1 | 1 | 1 | 1 | 1 | 1 |
| 0 | 1 | 0 | 1 | 0 | 0 | 0 | 0 | 0 | 0 | 0 | 0 | 0 | 0 | 0 | 1 | 1 | 1 | 1 | 1 |
| 0 | 1 | 0 | 0 | 0 | 0 | 0 | 0 | 0 | 0 | 0 | 0 | 0 | 0 | 0 | 0 | 1 | 1 | 1 | 1 |
| 0 | 0 | 1 | 1 | 0 | 0 | 0 | 0 | 0 | 0 | 0 | 0 | 0 | 0 | 0 | 0 | 0 | 1 | 1 | 1 |
| 0 | 0 | 1 | 0 | 0 | 0 | 0 | 0 | 0 | 0 | 0 | 0 | 0 | 0 | 0 | 0 | 0 | 0 | 1 | 1 |
| 0 | 0 | 0 | 1 | 0 | 0 | 0 | 0 | 0 | 0 | 0 | 0 | 0 | 0 | 0 | 0 | 0 | 0 | 0 | 1 |

FIG.13

INPUT / OUTPUT RELATIONSHIP
OF SECOND DECODER 303

| INPUT BIT | | | | OUTPUT BIT | | | | | | | | | | | | | | | |
|---|---|---|---|---|---|---|---|---|---|---|---|---|---|---|---|---|---|---|---|
| I3 | I2 | I1 | I0 | Q15 | Q14 | Q13 | Q12 | Q11 | Q10 | Q9 | Q8 | Q7 | Q6 | Q5 | Q4 | Q3 | Q2 | Q1 | Q0 |
| 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 0 | 0 | 0 | 0 | 0 | 0 | 0 | 0 | 0 | 0 | 0 | 0 | 0 |
| 1 | 1 | 0 | 1 | 1 | 1 | 1 | 0 | 0 | 0 | 0 | 0 | 0 | 0 | 0 | 0 | 0 | 0 | 0 | 0 |
| 1 | 1 | 0 | 0 | 1 | 1 | 1 | 1 | 0 | 0 | 0 | 0 | 0 | 0 | 0 | 0 | 0 | 0 | 0 | 0 |
| 1 | 0 | 1 | 1 | 1 | 1 | 1 | 1 | 1 | 0 | 0 | 0 | 0 | 0 | 0 | 0 | 0 | 0 | 0 | 0 |
| 1 | 0 | 1 | 0 | 1 | 1 | 1 | 1 | 1 | 1 | 0 | 0 | 0 | 0 | 0 | 0 | 0 | 0 | 0 | 0 |
| 1 | 0 | 0 | 1 | 1 | 1 | 1 | 1 | 1 | 1 | 1 | 0 | 0 | 0 | 0 | 0 | 0 | 0 | 0 | 0 |
| 1 | 0 | 0 | 0 | 1 | 1 | 1 | 1 | 1 | 1 | 1 | 1 | 0 | 0 | 0 | 0 | 0 | 0 | 0 | 0 |
| 0 | 1 | 1 | 1 | 1 | 1 | 1 | 1 | 1 | 1 | 1 | 1 | 1 | 0 | 0 | 0 | 0 | 0 | 0 | 0 |
| 0 | 1 | 1 | 0 | 1 | 1 | 1 | 1 | 1 | 1 | 1 | 1 | 1 | 1 | 0 | 0 | 0 | 0 | 0 | 0 |
| 0 | 1 | 0 | 1 | 1 | 1 | 1 | 1 | 1 | 1 | 1 | 1 | 1 | 1 | 1 | 0 | 0 | 0 | 0 | 0 |
| 0 | 1 | 0 | 0 | 1 | 1 | 1 | 1 | 1 | 1 | 1 | 1 | 1 | 1 | 1 | 1 | 0 | 0 | 0 | 0 |
| 0 | 0 | 1 | 1 | 1 | 1 | 1 | 1 | 1 | 1 | 1 | 1 | 1 | 1 | 1 | 1 | 1 | 0 | 0 | 0 |
| 0 | 0 | 1 | 0 | 1 | 1 | 1 | 1 | 1 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 1 | 1 | 1 | 1 | 1 | 1 | 0 |

FIG.14

Input / Output Relationship of Mask Circuit 309

| Input Bit | | | | | | | | | | | | | | | | | | | | | | Output Bit | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| I15 | I14 | I13 | I12 | I11 | I10 | I9 | I8 | I7 | I6 | I5 | I4 | I3 | I2 | I1 | I0 | I3' | I2' | I1' | I0' | Q15 | Q14 | Q13 | Q12 | Q11 | Q10 | Q9 | Q8 | Q7 | Q6 | Q5 | Q4 | Q3 | Q2 | Q1 | Q0 |
| I15 | I14 | I13 | I12 | I11 | I10 | I9 | I8 | I7 | I6 | I5 | I4 | I3 | I2 | I1 | I0 | 0 | 0 | 0 | 0 | I15 | I14 | I13 | I12 | I11 | I10 | I9 | I8 | I7 | I6 | I5 | I4 | I3 | I2 | I1 | I0 |
| I15 | I14 | I13 | I12 | I11 | I10 | I9 | I8 | I7 | I6 | I5 | I4 | I3 | I2 | I1 | I0 | 0 | 0 | 0 | 1 | I15 | I14 | I13 | I12 | I11 | I10 | I9 | I8 | I7 | I6 | I5 | I4 | I3 | I2 | I1 | 0 |
| I15 | I14 | I13 | I12 | I11 | I10 | I9 | I8 | I7 | I6 | I5 | I4 | I3 | I2 | I1 | I0 | 0 | 0 | 1 | 0 | I15 | I14 | I13 | I12 | I11 | I10 | I9 | I8 | I7 | I6 | I5 | I4 | I3 | I2 | 0 | 0 |
| I15 | I14 | I13 | I12 | I11 | I10 | I9 | I8 | I7 | I6 | I5 | I4 | I3 | I2 | I1 | I0 | 0 | 0 | 1 | 1 | I15 | I14 | I13 | I12 | I11 | I10 | I9 | I8 | I7 | I6 | I5 | I4 | I3 | 0 | 0 | 0 |
| I15 | I14 | I13 | I12 | I11 | I10 | I9 | I8 | I7 | I6 | I5 | I4 | I3 | I2 | I1 | I0 | 0 | 1 | 0 | 0 | I15 | I14 | I13 | I12 | I11 | I10 | I9 | I8 | I7 | I6 | I5 | I4 | 0 | 0 | 0 | 0 |
| I15 | I14 | I13 | I12 | I11 | I10 | I9 | I8 | I7 | I6 | I5 | I4 | I3 | I2 | I1 | I0 | 0 | 1 | 0 | 1 | I15 | I14 | I13 | I12 | I11 | I10 | I9 | I8 | I7 | I6 | I5 | 0 | 0 | 0 | 0 | 0 |
| I15 | I14 | I13 | I12 | I11 | I10 | I9 | I8 | I7 | I6 | I5 | I4 | I3 | I2 | I1 | I0 | 0 | 1 | 1 | 0 | I15 | I14 | I13 | I12 | I11 | I10 | I9 | I8 | I7 | I6 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 0 | 1 | 1 | 1 | I15 | I14 | I13 | I12 | I11 | I10 | I9 | I8 | I7 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 0 | 0 | 0 | I15 | I14 | I13 | I12 | I11 | I10 | I9 | I8 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 0 | 0 | 1 | I15 | I14 | I13 | I12 | I11 | I10 | I9 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 0 | 1 | 0 | I15 | I14 | I13 | I12 | I11 | I10 | 0 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 0 | 1 | 1 | I15 | I14 | I13 | I12 | I11 | 0 | 0 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 1 | 0 | 0 | I15 | I14 | I13 | I12 | 0 | 0 | 0 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 1 | 0 | 1 | I15 | I14 | I13 | 0 | 0 | 0 | 0 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 1 | 1 | 0 | I15 | I14 | 0 | 0 | 0 | 0 | 0 | 0 | 0 | 0 | 0 | 0 | 0 | 0 | 0 | 0 |
| I15 | I14 | I13 | I12 | I11 | I10 | I9 | I8 | I7 | I6 | I5 | I4 | I3 | I2 | I1 | I0 | 1 | 1 | 1 | 1 | I15 | 0 | 0 | 0 | 0 | 0 | 0 | 0 | 0 | 0 | 0 | 0 | 0 | 0 | 0 | 0 |

LIMITER CIRCUIT PRODUCING DATA BY USE OF COMPARISON IN EFFECTIVE DIGIT NUMBER OF DATA

BACKGROUND OF THE INVENTION

I. Field of the Invention

This invention relates to a limiter circuit and, more particularly, to a limiter circuit responding to input digital data and performing a limiting operation thereon to produce output digital data.

II. Description of the Prior Art

Such a limiter circuit is disclosed in Japanese Patent Application Laid Open No. Sho 60-220402 and shown FIG. 1.

In FIG. 1, reference numeral 101 depicts an arithmetic operation unit, 201 upper limit data, and 202 lower limit data. This limiter circuit further includes a first comparator 102 comparing the upper limit value 201 with the data derived from the arithmetic operation unit 101, a second comparator 103 comparing the lower limit value 202 with the data from the arithmetic operation unit 101, and a selector 104 selects and thus outputs either one of the output of the arithmetic operation unit 101, the upper limit value 201 and the lower limit value 202, in response to the comparison outputs of the comparators 102 and 103.

In operation, when the output of the arithmetic operation unit 101 is within a range determined by the upper limit value 201 and the lower limit value 202, the outputs of the comparator 102 and 103 take a first state. The selector 104 thereby selects and produces the output of the arithmetic operation unit 101. When the output of the arithmetic operation circuit 101 is beyond the above range, the outputs of the comparators 102 and 103 take a second state to cause the selector 104 to selects the upper limit value 201. Finally, the arithmetic output does not reach the above range, the selector 104 selects the lower limit value 202 in response to a third state indicated by the outputs of the comparators 102 and 103.

In comparison operation of the comparators 102 and 103, the comparator 102 outputs the high level when the output of the arithmetic operation circuit 101 is larger than the upper limit value 201 and the low level when the former is equal to or smaller than the latter. On the other hand, the comparator 103 produces the high level output when the output of the arithmetic operation circuit 101 is smaller than the lower limit value 202 and the low level output when the former is equal to or larger than the latter.

Accordingly, the second state is represented by the high level of the comparator 102 and the low level of the comparator 103. The third state is represented by the low level of the comparator 102 and the high level of the comparator 103. The first state is represented by the low levels of the comparators 102 and 103.

The limiter circuit thus constructed can be applied to a digital signal processing apparatus, an image processing apparatus and the like. Such an apparatus requires a high-speed processing operation, as well known in the art. The limiter circuit employed such an apparatus is thus also required to perform a high-speed limiting operation. However, the limiter circuit of FIG. 1 operates at a relatively low speed.

More specifically, each of the comparators 102 and 103 performs the comparison operation on digital data and is thus required to compare every bit thereof in sequence from the least significant bit to the most significant bit. For this reason, each comparator takes a relatively long comparison time. Moreover, it depends on the bit range of the data.

For example, a comparator having a 16-bit input produces a delay time approximately four times as large as a comparator having a 4-bit input, and a comparator having 32-bit input produces a delay time approximately 6 times as large as a comparator having 5-bit input. Therefore, it is difficult to realize high-speed signal processing by the limiter circuit as shown in FIG. 1.

SUMMARY OF THE INVENTION

It is therefore an object of the present invention is to provide an improved limiter circuit for digital data.

Another object of the invention is to provide a limiter circuit which performs a desired operation at a high speed.

A limiter circuit according to the present invention is used to limit in value an output data to a limit value in response to an input data and includes an encoder detecting an effective number of the input data and producing a first data indicative of the effective digit number of the input data, a set of terminals receiving a second data indicative of an effective digit number of the limit value, a comparator comparing the first data with the second data, a decoder decoding the second data to produce a third data indicative of the limit value, and a selector selecting one of the input data and the third data in response to a comparison output from the comparator.

In the present invention, therefore, the comparator compares the input data with the limit value in the effective digit number or the number of effective digits, not in raw number or value thereof. The bit length of the effective digit number (the number of effective digits) is shorter than that of each of the input data and the limit value. Thus, the comparison operation is performed at a high speed.

The input data is frequently required to be compared with two value, i.e. the upper limit value and the low limit value. Moreover, the input data may take both of a positive value and a negative value. To meet those cases, it is preferable to further provide an additional encoder detecting an effective digit number of the input data having a negative value to produce fourth data, an additional comparator comparing the fourth data with fifth data indicative of an effective digit number of the lower value, and an additional decoder producing sixth data indicative of the lower limit value. Further, the selector is constructed to further receive the sixth data in addition to the input data and the third data and select one of them in response to comparison outputs of the two comparators.

It is to be noted that the term "The effective digit number" or "the number of significant digits" represents the number of significant bits (or digits) at which meaningful data exist, respectively, and is denoted as a binary data. Moreover, the input data having its most significant bit of "0" represents a positive value, whereas the input data having its the most significant bit of "1" represents a negative value.

For example in 16-bit data, assuming that the data is represented by a binary data of "0000000000000011(2)", the effective digit number thereof or the number of effective digits is "0010(2)". As for the data of "0000000000000110(2)", the effective digit number is "0011(2)". Further, the number of significant digits for the data of "0000000000001101(2)" is "0100(2)". Note that the symbol "(2)" represents the binary notation. As for the negative data such as "1111111111001111(2)", the number of significant digits thereof is "0110(2)". However, for exception, the number of significant digits for the negative-valued data of "1111111111111111(2)" is expressed as "0001 (2)", in the present invention. The negative-value data is represented by 2's complement.

As mentioned above, the data comparison is performed in the form of the effective digit number form or the number of effective digits. Accordingly, the number of significant digits of "0100(2)" is larger than that of "0011(2)", for example. Similarly, the number of digits of "0010(2)" is smaller than that of "0011(2)".

On the other hand, the number of significant digits of "0100(2)" is larger than that of "0011(2)" for negative valued data; however in a corresponding negative 16-bit data, the latter is larger than the former.

BRIEF DESCRIPTION OF THE DRAWING

The above objects, features and advantages of the present invention will be more apparent from the following description taken in conjunction with the accompanying drawing, in which:

FIG. 11 is a chart illustrative of an input/output relationship of the first priority encoder 304 shown in FIG. 1;

FIG. 12 is a chart illustrative of an input/output relationship of the second priority encoder 305 shown in FIG. 1;

FIG. 13 is a chart illustrative of an input/output relationship of the first decoder 302 shown in FIG. 1;

FIG. 14 is a chart illustrative of an input/output relationship of a second decoder 303 shown in FIG. 1;

FIG. 16 is a chart illustrative of an input/output relationship of a mask circuit 309 shown in FIG. 15.

DETAILED DESCRIPTION OF THE PREFERRED EMBODIMENTS

Figure 1:
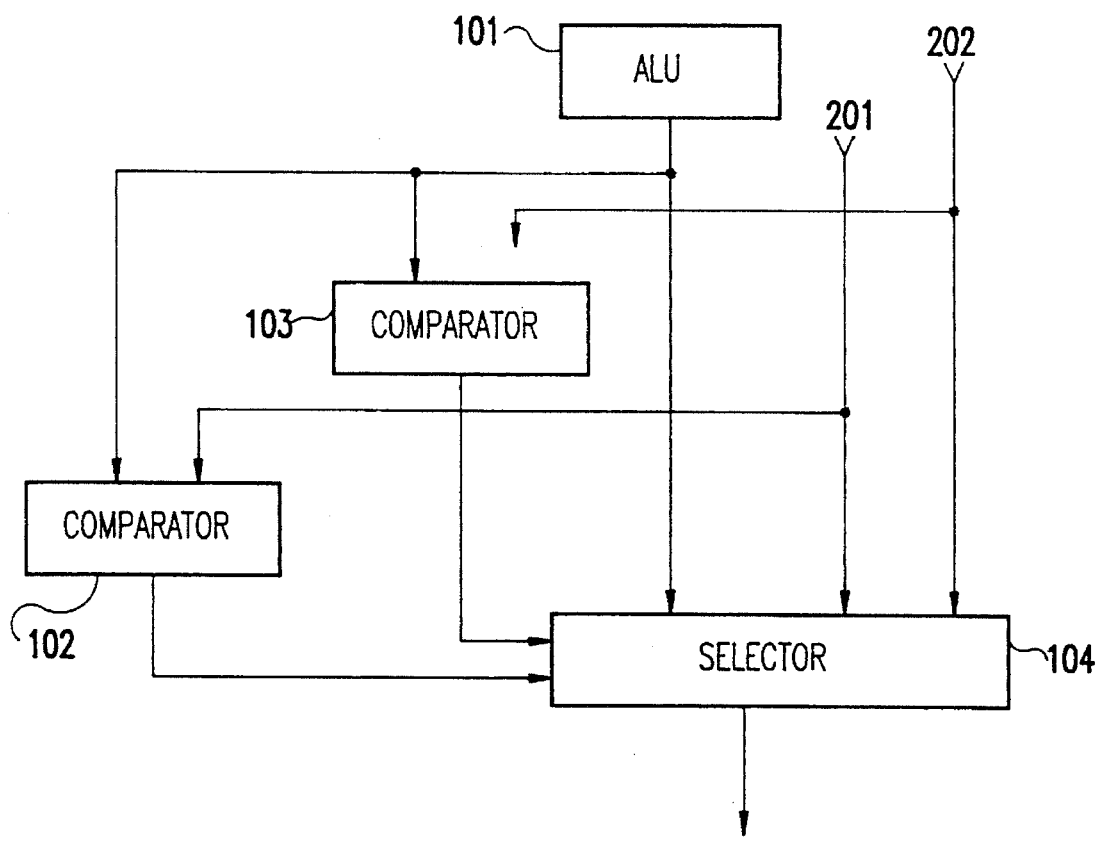
FIG. 1 is a block diagram illustrative of a prior art limiter circuit.
Figure 2:
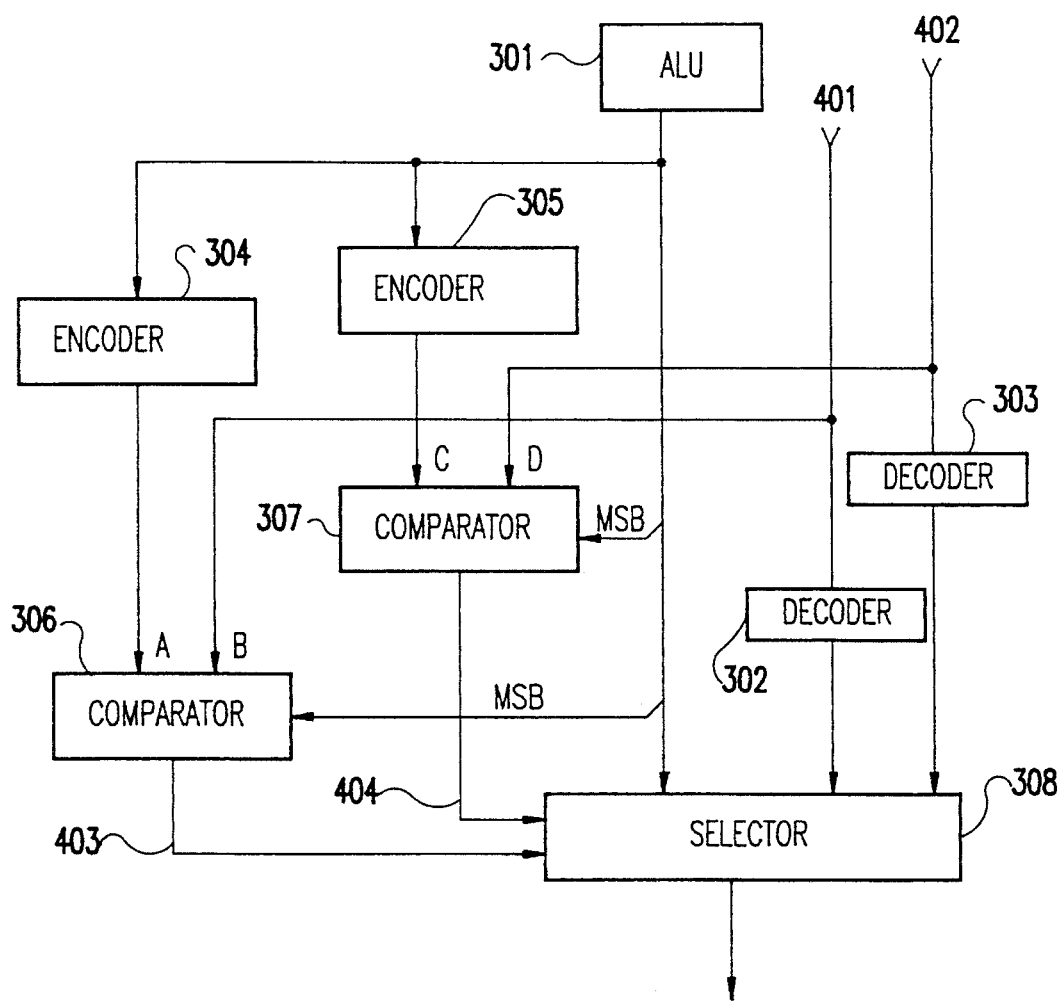
FIG. 2 is a block diagram illustrative of an embodiment of the present invention.

Referring now to FIG. 2, the limiter circuit according to the embodiment of the present invention receives the arithmetic resultant data having its bit length of 16-bit from an arithmetic operation unit 301. This circuit further receives data 401 indicative of the number of effective digits of an upper limit value and data 402 indicative of the number of effective digits of a lower limit value. In the following the number of the effective digits is expressed by the effective digit number.

The present limiter circuits includes a first priority encoder 304 encoding and thus converting the arithmetic resultant data into first data of 4-bit indicative of the effective digit number thereof, and a second priority encoder 305 which also encodes and thus converts the arithmetic data into second data of 4-bit indicative of the effective digit number thereof. This circuit further includes a first comparator 306 comparing the first data from the first priority encoder 304 with the effective digit number data 401 of the upper limit value, and a second comparator 307 comparing the second data from the second priority encoder 305 with the effective digit number data 402 of the lower limit value. The effective digit number data 401 and 402 are further supplied respectively to decoders 302 and 303. The decoder 401 converting decodes and thus converts the effective digit number data 401 into a data of 16-bit indicative of the upper limit value, and the decoder 303 decodes and thus converts the effective digit number data 402 into a data of 16-bit indicative of the lower limit value. The arithmetic data and the data from the decoders 302 and 303 are then supplied to a selector 304 which selects and thus outputs either one of them in response to comparison output signals 403 and 403 from the comparators 306 and 307.

Figure 5:
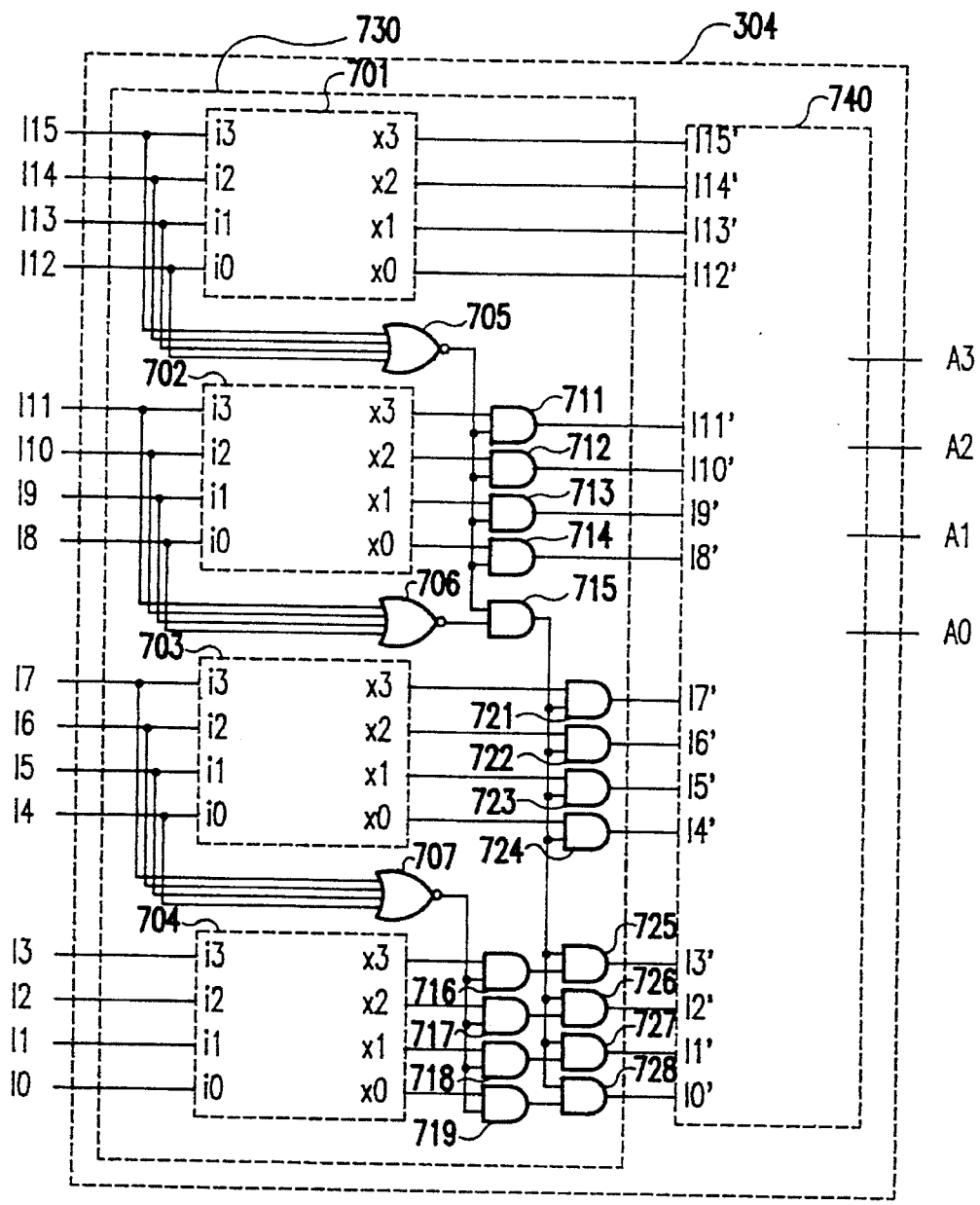
FIG. 5 is a circuit diagram of a first priority encoder 304 shown in FIG. 2.

Turning to FIG. 5, the first priority encoder 304 includes a 1-detecting section 730 detecting "1" from output data of the arithmetic operation unit 301, and an encoder section 740 outputting the corresponding effective digit number from its detected result. The 1-detecting section 730, which inputs 16-bit data, i.e., an output from the arithmetic operation circuit 301, comprises 4-bit 1-detecting sections 701, 702, 703 and 704 for detecting "1" in priority from upper order bits for the 4-bit inputs, 4-input NOR gates 705, 706 and 707, 2-input AND gates 711 to 719, and 2-input AND gates 721 to 728. The 4-bits of upper order I15 to I12 from among 16-bit data input from the arithmetic operation circuit 301 are made inputs i3 to i0 of the 4-bit 1-detecting section 701 and an input of 4-input NOR gate 705. An output of 4-input NOR gate 705, when "1" is detected by 4-bits of inputs I15 to I12, becomes signals for masking a 1-detected result for inputs of the lower order 12-bits I11 to I0. The 4-bits of I11 to I8 are made inputs i3 to i0 of the 4-bit 1-detecting section 702 and an input of 4-input NOR gate 706. The outputs of 4-input NOR gates 705 and 706 are made into a logical product by the 2-input AND gate 715. An output of the 2-input AND gate 715 is, when detecting "1" in 8-bits of inputs I15 and I8, made signals for masking a 1-detected result for an input of the lower order 8-bits of I7 to I0.

Similarly, 4-bits of I7 to I4 are made inputs i3 to i0 of 4-bit 1-detecting section 703 and an input of 4-input NOR gate 707, an output of 4-input NOR gate 707 is, when detecting "1" in 4-bits of inputs I7 to I4, made signals for masking a 1-detecting result for an input of lower order 4-bits I3 to I0. The 4-bits of I3 to I0 are made inputs i3 to i0 of the 4-bit 1-detecting section 704. The outputs 4-bit x 3 to x 0 of the 4-bit 1-detecting section 701 are connected to inputs I15' to I12' of the encoder section 740.

The output of the 4-input NOR gate 705 is input into 2-input AND gates 711 to 714 respectively, the other-side inputs of the 2-input AND gates 711 to 714 are input with 4-bit output x 3 to x 0 of the 4-bit 1-detecting section 702 respectively. The outputs of AND gates 711 to 714 are connected to I11' to I8' of the encoder section 740.

The output of the 2-input AND gate 715 is input into 2-input AND gates 721 to 724 respectively, the other-side inputs of the 2-input AND gates 721 to 724 are input with 4-bit output x 3 to x 0 of the 4-bit 1-detecting section 703 respectively. The outputs of AND gates 721 to 724 are connected to I7' to I4' of the encoder section 740.

The output of the 4-input NOR gate 707 is input into 2-input AND gates 716 to 719 respectively, the other-side inputs of the 2-input AND gates 716 to 719 are input with 4-bit output x 3 to x 0 of 4-bit 1-detecting section 704 respectively. The outputs of AND gates 716 to 719 are input into 2-input AND gates 725 to 728 respectively, the other-side inputs of the 2-input AND gates 725 to 728 are input with an output of the 2-input AND gate 715. Outputs of AND gates 725 to 728 are connected to I3' to I0' of the encoder section 740.

Figure 9:
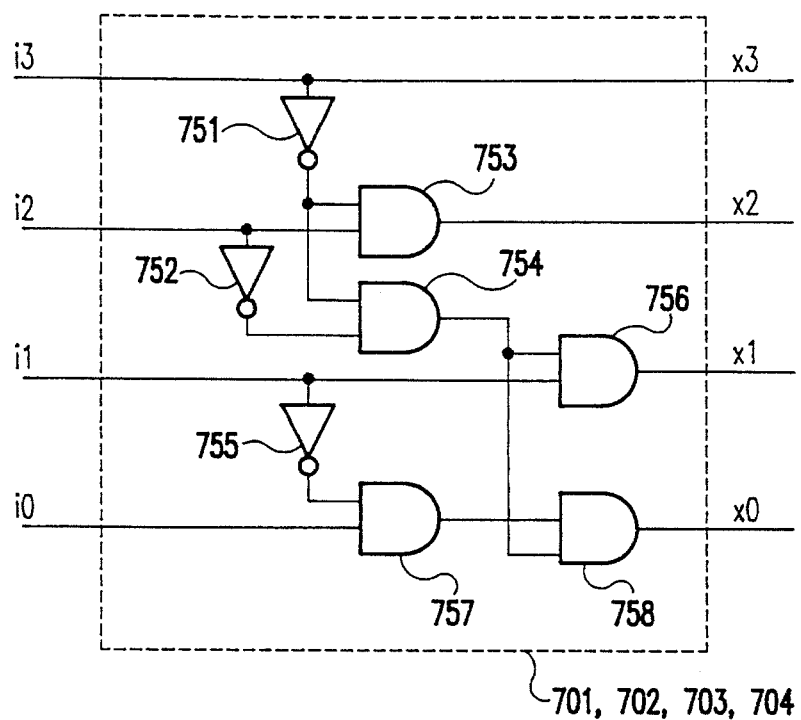
FIG. 9 is a circuit diagram of each of a 4-bit/1-detection units 701, 702, 703 and 704 shown in FIG. 5.

Turning to FIG. 9, each of the 4-bit 1-detecting sections 701 to 704 shown in FIG. 5 comprises inverters 751, 752 and 755, and 2-input AND gates 753, 754, 756, 757 and 758. The 4-bit 1-detecting section 701 obtains 4-bit outputs of x 3 to x 0 for 4-bit inputs of i3 to i0. Numeral i3 is made an input of the inverter 751, and simultaneously is output as x 3 as it is, and i1 is input into the inverter 752 and the AND gate 753. Numeral i2 is input into the AND gate 756 and the inverter 755, and i0 is input into the AND gate 757. The output of the inverter 751 and the i2 are made into a logical product in the AND gate 753, and are output as x 2. An output of the inverter 751 and an output of the inverter 752 are produced into a logical product in the AND gate 754, and output x 1 is an output produced at the AND gate 756 as a logical product of the output of AND gate 754 and the i1. Furthermore, a logical product of the output of inverter 755 and the i0 is obtained in the AND gate 757, and x 0 is an output produced at the AND gate 758 as a logical product of the output of AND gate 757 and the output of AND gate 754.

Figure 7:
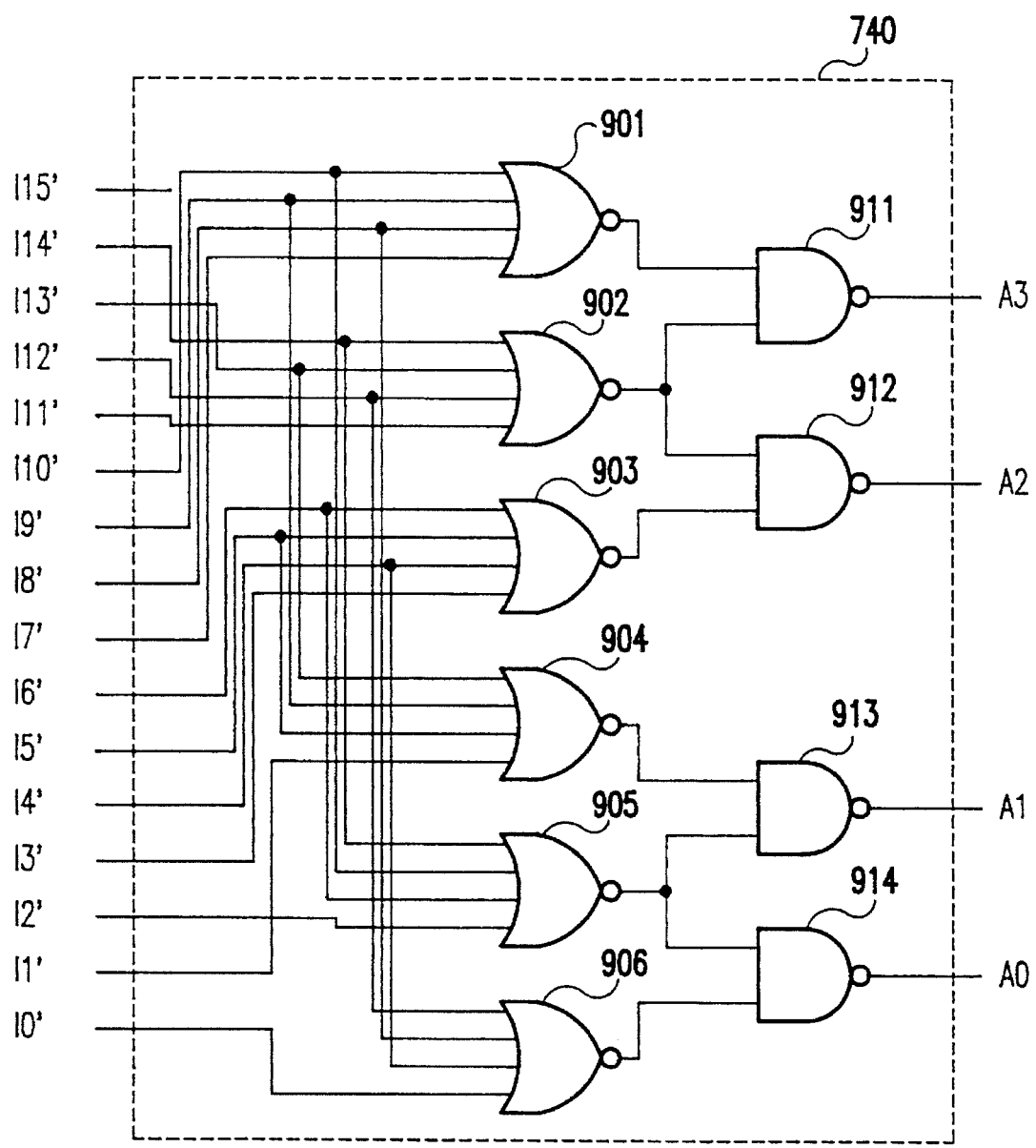
FIG. 7 is a circuit diagram of an encoder 740 shown in FIG. 5.

Referring to FIG. 7, the an encoder section 740 shown in FIG. 5 comprises 6 pieces of 4-input NOR gates 901 to 906, and 4 pieces of 2-input NAND gates 911 to 914. The NOR gate 901 is input with I10' to I7', the NOR gate 902 is input with I14' and I11', the NOR gate 903 is input with I6' to I3', the NOR gate 904 is input with I13', I9', I5', and I1', the NOR gate 905 is input with I14', I10', I6' and I2', and the NOR gate 906 is input with I12', I8', I4' and I0'. Numeral I15' in FIG. 7 is a code bit. The outputs of the NOR gates 901 and 902 are input into the NAND gate 911, and are output therefrom to A3, outputs of the NOR gates 902 and 903 are input into the NAND gate 912, and are output therefrom to A2. Outputs of the NOR gates 904 and 905 are input into the NAND gate 913, and are output therefrom to A1. Outputs of the NOR gates 905 and 906 are input into the NAND gate 914, and are output therefrom to A0.

Figure 3:
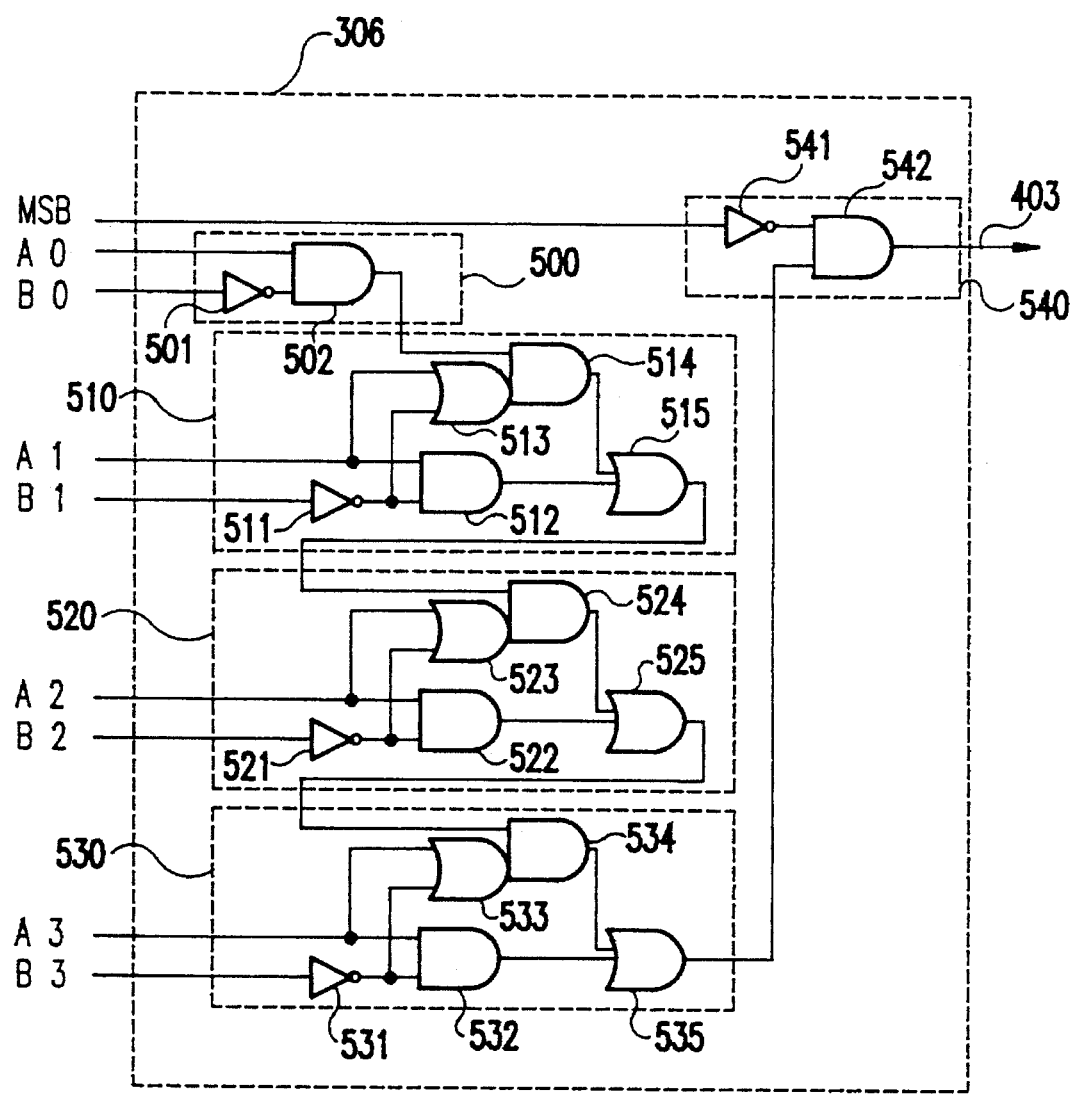
FIG. 3 is a circuit diagram of a first comparator 306 shown in FIG. 2.

Turning to FIG. 3, there is shown the first comparison circuit 306. Two kinds of 4-bit data A and B, and the most significant bit (MSB) of output data from the arithmetic operation unit 301 are input into the first comparison circuit 306, and a first control signal 403 is output from the first comparison circuit 306. The 3- to 0-bits of the significant digit number 401 of the upper limit value are input into 4-bits of B3 to B0. The 3- to 0-bits representing the significant digit number outputted from the first priority encoder 304 are input into 4-bits of A3 to A0.

The first comparison circuit 306 comprises a 0-bit comparison section 500 inputted of A0 and B0, a 1-bit comparison section 510 inputted of A1 and B1, a 2-bit comparison section 520 inputted of A2 and B2, a 3-bit comparison section 530 inputted of A3 and B3, and an output control section 540 inputted of MSB and a final stage comparison result. The 0-bit comparison section 500 is formed of the inverter 501 and an AND gate 502. B0 is input into the inverter 501, its inverted output value and A0 are input into the AND gate 502. The 1-bit comparison section 510 is formed of an inverter 511, AND gates 512 and 514, and OR gates 513 and 515.

A1 is input into the AND gate 512 and the OR gate 513, B1 is input into the inverter 511, its inverted output value is input into the AND gate 512 and the OR gate 513. A comparison result of an output of the OR gate 513 and a lower order bit lowered therefrom by 1 is input into the AND gate 514. The output of the AND gate 514 and an output of the AND gate 512 are an input of the OR gate 515, an output of the OR gate 515 comes to a result of the 1-bit comparison section 510.

The 1-bit comparison section 510 and 2-bit comparison section 520 and 3-bit comparison section 530 are entirely the same circuit construction with each other.

The 2-bit comparison section 520 is formed of an inverter 521, AND gates 522, 524 and OR gates 523, 525. A2 is input into the AND gate 522 and the OR gate 523, B2 is input into the inverter 521, its inverted output value is input into the AND gate 522 and OR gate 523.

The 3-bit comparison section 530 comprises an inverter 531, AND gates 532, 534 and OR gates 533, 535. A3 is input into the AND gate 532 and the OR gate 533. B3, after being input to the inverter 531, allows its inverted output value to be input into the AND gate 532 and the OR gate 533.

The output control section 540 is formed of an inverter 541 and an AND gate 542. MSB is input into the inverter 541, and the AND gate 542 is input with an output of the inverter 541 and a final comparison result outputted from the 3-bit comparison section 530.

The encoder 304 (FIG. 2) responds to the data supplied thereto and generates encoded data in accordance with the relationship as shown in FIG. 11, wherein the left-side input bits I15 to I0 correspond to 16-bits that is an output of the arithmetic operation circuit 301, and the output bits Q3 to Q0 correspond to inputs A3 to A0 of the first comparison circuit 306. Each of marks x in the drawings designates that either of "1" or "0" may be used. The first priority encoder 304 inputs a 16-bit output of the arithmetic operation circuit 301, and outputs, with 4-bits as the significant digit number, a bit position where "1" firstly appears viewed from the upper order bit.

As for the decoder 302, on the other hand, it performs the decoding operation as shown in FIG. 13, wherein the left-side input bits I3 to I0 correspond to 4-bits of the significant digit number 401 of the upper limit value, and right-side output bits Q15 to Q0 correspond to 16-bits outputted in the selecting circuit 308. The first decoder 302 inputs 4-bits of the significant digit number 401 of the upper limit value, and outputs maximum positive 16-bits represented by such digit number.

Description will be made below on a case where the output of the arithmetic operation circuit 301 exceeds maximum positive 16-bit data expressed by the effective digit number data 401 of the upper limit value. In order to facilitate the understanding of the circuit an example wherein the output of the arithmetic operation circuit 301 is a positive integer value of "0010000001001001(2)" and the effective digit number data 401 of the upper limit value is "0100(2)".

The output of the arithmetic operation circuit 301 is supplied to the first priority encoder 304, in which the more significant I15 to I12 bits "0010(2)" are input into the 4-bit 1-detecting section 701 in the 1-detecting section 730 of the first priority encoder 304 shown in FIG. 5. Similarly, "0000(2)" of inputs I11 to I8 bits is input into a 4-bit 1-detecting section 702, "0100(2)" of inputs I7 to I4 bits is input into the 4-bit 1-detecting section 703, and "1001(2)" of inputs I3 to I0 bits is input into the 4-bit 1-detecting section 704.

Each of the 4-bit 1-detecting sections 701, 702, 703 and 704 has the same circuit construction with a logical product of an inverted signal of upper order bit and a lower order-side bit. Hence, if "1" is provided on the upper order bit, the lower order bits equal to or less than such upper order bit are all masked to "0". At that time, the 4-bit 1-detecting section 701 outputs "0010(2)"; the 4-bit 1-detecting section 702 outputs "0000(2) "; the 4-bit 1-detecting section 703 outputs "0100(2)"; and the 4-bit 1-detecting section 704 outputs "1000(2)".

The outputs of the 4-bit 1-detecting sections 702, 703, and 704 are connected to one-side inputs of the AND gates 711 to 714, 721 to 724, and 716 to 719. The other-side inputs of those AND gates are supplied with output values of NOR gates 705 and 707 outputting "0" when "1" is detected at the high order bit-side thereof, and further with the output value of the AND gate 715. Thus, if "1" is present on the upper order bit-side, the detected result of the 4-bit detecting section of the lower order bit-side is masked to "0", the result of the 4-bit 1-detecting section on the upper order bit-side is outputted with priority.

Since the inputs I15 to I0 of the 1-detecting section 730 are "0010000001001001(2)", the output of the 4-bit 1-detecting section 701 is "0010(2)", and the data "0010000000000000(2)" are output as I15' to I0' in a form of masking lower order 12-bits in "0".

The 1-detecting section 730 in the arrangement above outputs a bit firstly detecting "1" as "1" and the other bits as "0" with priority of the upper order bit for 16-bit inputs I15 to I0.

The encoder section 740 is thus supplied with "0010000000000000(2)". In the encoder section 740 in FIG. 7, only the input I13' is "1", so that the 4-input NOR gates 902 and 904 output "0" and the other 4-input NOR gates 901, 903, 905 and 906 output "1". In the encoder section 740, the output of the NOR gate 902 is supplied to NAND gates 911 and 912, from which "1" is produced as each of the outputs A3 and A2. The output of the NOR gate 904 is supplied to the NAND gate 913, so that "1" is derived as the output A1. Since the inputs to the NAND gate 914 both are "1", "0" is derived as the output A0. The outputs A0 to A4 of the encoder section 740 thus takes data of "1110(2)".

The first priority encoder 304 thus detects "1" with priority for upper order bit and thus converts it into 4-bits expressing its effective digit number of the input 16-bit data. In summary, since "1" first appears at 14th bit of the input data of "0010000001001001(2)", and the first priority encoder 304 outputs the effective digit number data of "1110(2)".

This data is then supplied to the first comparison circuit 306 (see FIG. 3) as the first input A, which also has the second input B receiving the 4-bit data of "0100(2)" as the effective digit number data 401 of the upper limit value. The 0-bit comparison section 500 outputs "1" ojly when A0 is "1" and B0 is "0", i.e. , A0 is larger than B0, therefore an output of the 0-bit comparison section 500 is "0".

The 1-bit comparison section 510 compares the input A1 with the input B1. In the 1-bit comparison section 510, when A1 is "1" and B1 is "0", or when A1 is larger than B1, the output of the AND gate 512 is "1", hence the output of the 1-bit comparison section 510 is "1".

The 2-bit comparison section 520 compares the input A2 with an input B2. When the inputs A2 and B2 are equal to each other (in this case, A2="1", B2="1"), an output of the OR gate 523 is "1", and the output of the 1-bit comparison section on lower order bit-side is the output of the 2-bit comparison section 520, as it is.

The 3-bit comparison section 530 compares the input A3 with the input B3. When A3 is "1" and B3 is "0", or when A3 is larger than B3, then the output of the AND gate 532 is "1", and the output of the 3-bit comparison section 530 is "1".

In the output control section 540, the output of the inverter 541 is "1" due to MSB of "0", and "1" is output without being masked of the output result of the 3-bit comparison section 530. Consequently, the first comparison circuit 306 outputs "1" as the first comparison signal 403 designating that the output of the first priority encoder 304 exceeds the significant digit number 401 of the upper limit value in. That is, it is represented that the arithmetic resultant data is larger than the upper limit value.

Figure 4:
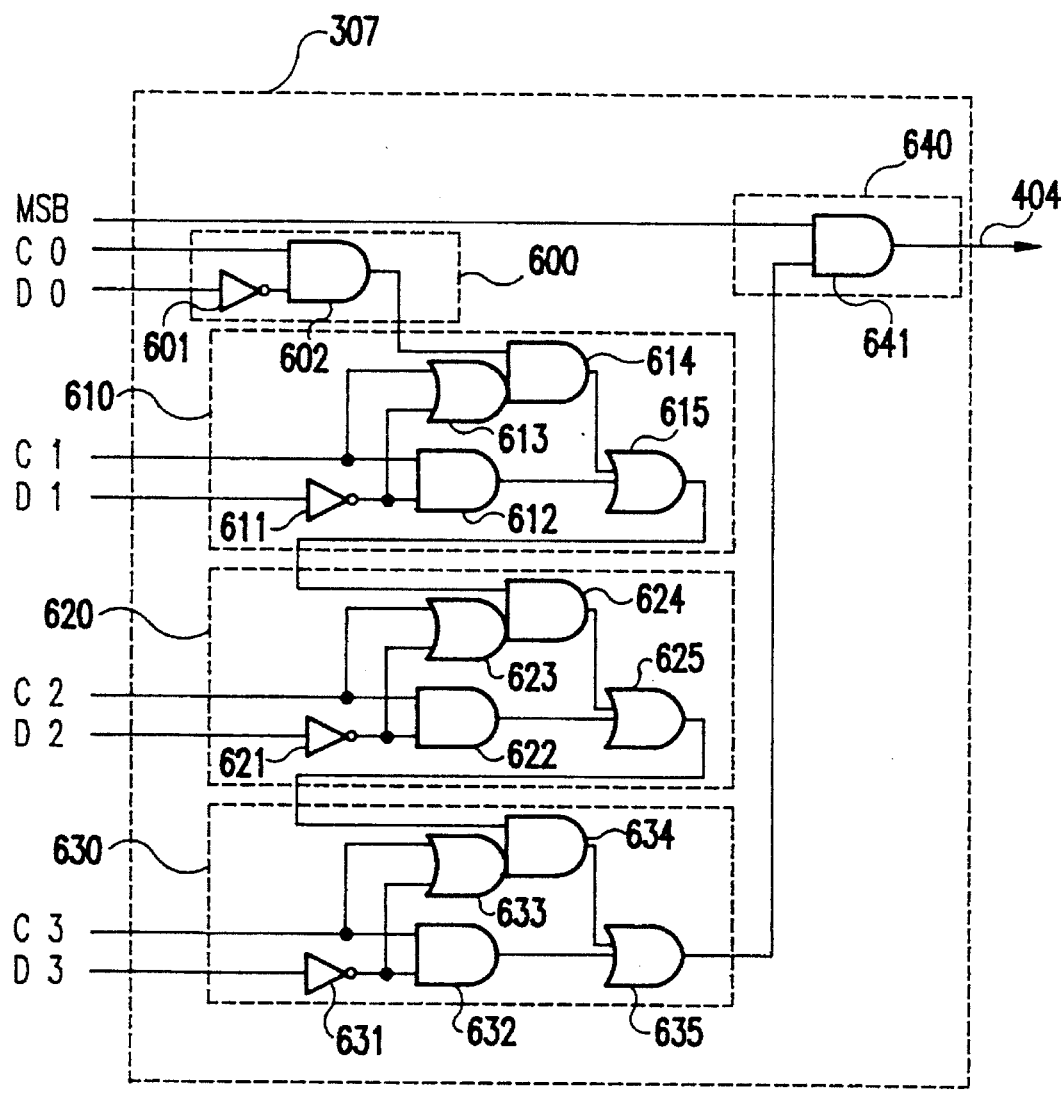
FIG. 4 is a circuit diagram of a second comparator 307 shown in FIG. 2.

In the second comparator 307, the MSB of the output from the arithmetic operation unit 301 is "0", so that this comparator 307 is masked to produce "0" as its comparison signal 404 (see FIG. 4).

On the other hand, the first decoder 302 outputs the data of "0000000000001111(2)" in response to the effective digit number 401 of "0100 (2)", as shown in FIG. 13.

The selecting circuit 308 selects the output of the first decoder 302 because the signal 403 is at "1" and the signal 404 is at "0" as an output data that is equal to "0000000000001111(2)". Thus, when the output of the arithmetic operation unit 301 exceeds the upper limit value, the limitation is carried out in the manner as described above.

In this way, the limiter system in accordance with the embodiment, in which the positive output of the arithmetic operation circuit 301 is limited by the positive maximum value represented by the significant digit number 401 of the upper limit value, is to achieve the limiting operation in accordance with the comparison process using the effective digit number and therefore the limiter system of the invention is capable of a high-speed limiting operation with shortened comparison-process time in the amount corresponding to the reduced bit number, in comparison with the conventional comparison circuit performing largeness comparison sequentially at every bit basis.

On the other hand, when the effective digit number of the arithmetic output is smaller than the effective digit number of the upper limit value, the selecting circuit 308 outputs the output of the arithmetic operation circuit 301 as it is.

Figure 6:
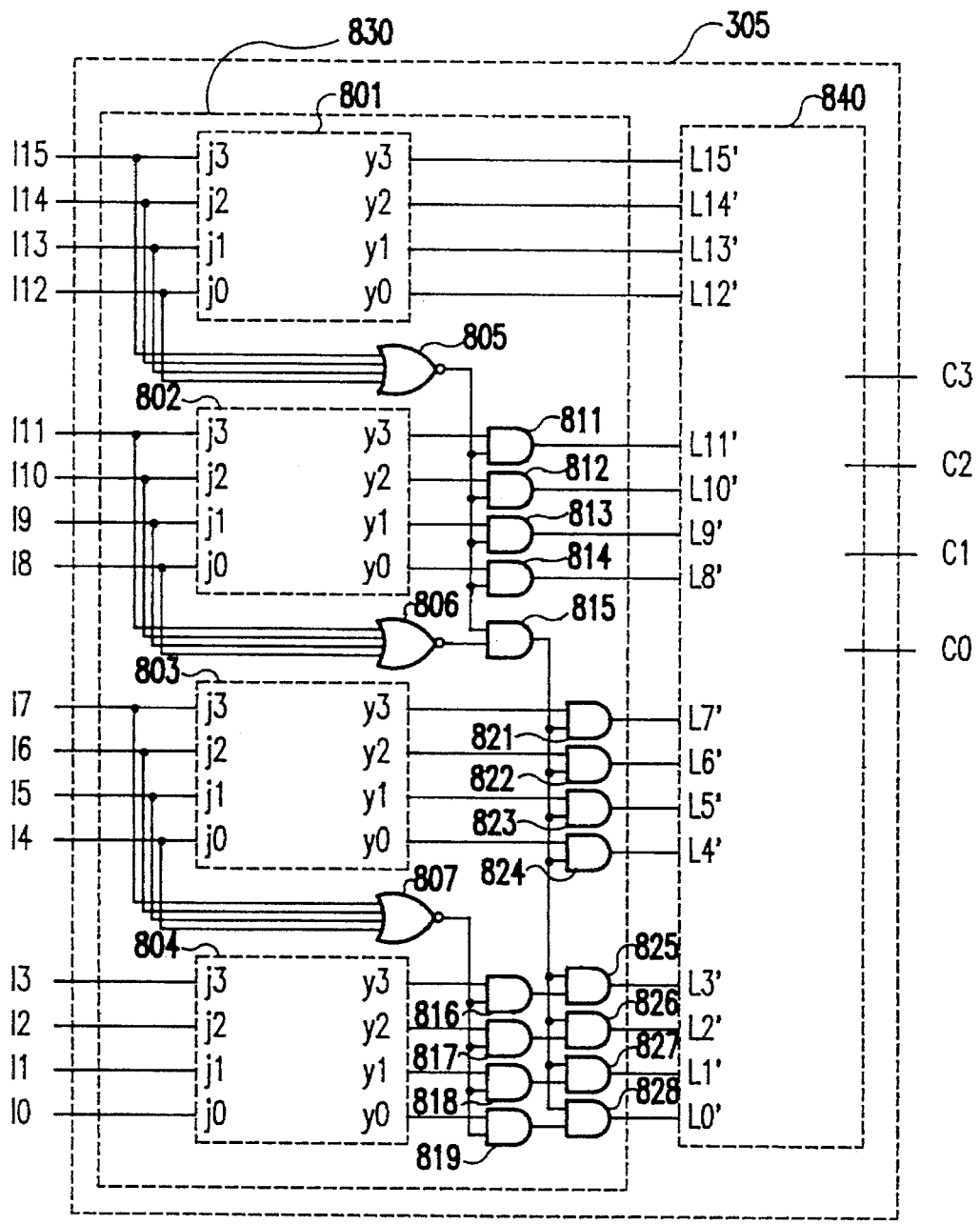
FIG. 6 is a circuit diagram of a second priority encoder 305 shown in FIG. 2.

Referring to FIG. 6, the second priority encoder 305 comprises a 0-detecting section 830 for detecting "0" from an output of the arithmetic operation unit 301, and an encoder section 840 for outputting the corresponding significant digit number from that detected resultor. The 0-detecting section 830, which inputs 16-bit data of an output of the arithmetic operation unit 301, comprises 4-bit 0-detecting sections 801, 802, 803, and 804 for detecting "0" in priority from the upper order bit for each 4-bit input, 4-input AND gates 805, 806, and 807, 2-input AND gates 811 to 819, and 2-input AND gates 821 to 828.

The upper order 4-bits I15 to I12 from among the 16-bit input data are made as inputs j3 to j0 of the 4-bit 0-detecting section 801 and an input of the 4-input AND gate 805. An output of the 4-input AND gate 805, when detecting "0" in 4-bits of inputs I15 to I12, becomes a signal for masking a 0-detected result for inputs of the lower order 12-bits I11 to I0.

The 4-bits of I11 to I8 are made as inputs j2 to j0 of the 4-bit 0-detecting section 802 and inputs of the 4-input AND gate 806.

Outputs of the 4-input AND gates 805 and 806 are made into a logical product at the 2-input AND gate 815. An output of the 2-input AND gate 815, when detecting "0" in 8-bits of inputs I15 to I8, comes to a signal for masking a 0-detected result for inputs of the lower order 8-bits I7 to I0.

Similarly, 4-bits of I7 to I4 are made as inputs j3 to j0 of the 4-bit 0-detecting section 803 and inputs of the 4-input AND gate 807. An output of the 4-input AND gate 807, when detecting "0" at 4-bits of inputs I7 to I4, is a signal for masking a 0-detected result for inputs of lower order 4-bits I3 to I0. Four bits of I3 to I0 are made as inputs j3 to j0 of the 4-bit 0-detecting section 804.

Outputs 4-bits y3 to y0 of the 4-bit 0-detecting section 801 are connected to inputs L15' to L12' of the encoder section 804. An output of the 4-input AND gate 805 is input into 2-input AND gates 811 to 814, and the other-side inputs of the 2-input AND gates 811 to 814 are input with outputs 4-bits y3 to y0 of the 4-bit 0-detecting section 802 respectively.

Outputs of the AND gates 811 to 814 are connected to L11' to L8' of the encoder section 840. An output of 2-input AND gate 815 are input into 2-input AND gates 821 to 824 respectively, the other-side inputs of the 2-input AND gates 821 to 824 are input with outputs 4-bits y3 to y0 of the 4-bits 0-detecting section 803 respectively.

Outputs of the AND gates 821 to 824 are connected to L7' to L4' of the encoder section 840. An output of the 4-input AND gate 807 is input into 2-input AND gates 816 to 819 respectively, the other-side inputs of the 2-input AND gates 816 to 819 are input with outputs 4-bits y3 to y0 of the 4-bit 0-detecting section 804 respectively. Outputs of the AND gates 816 to 819 are input into 2-input AND gates 825 to 828 respectively, the other-side inputs of the 2-input AND gates 828 to 828 are input with an output of the 2-input AND gate 815. Outputs of the AND gates 825 to 828 are connected to L3' to L0' of an encoder 840.

Figure 10:
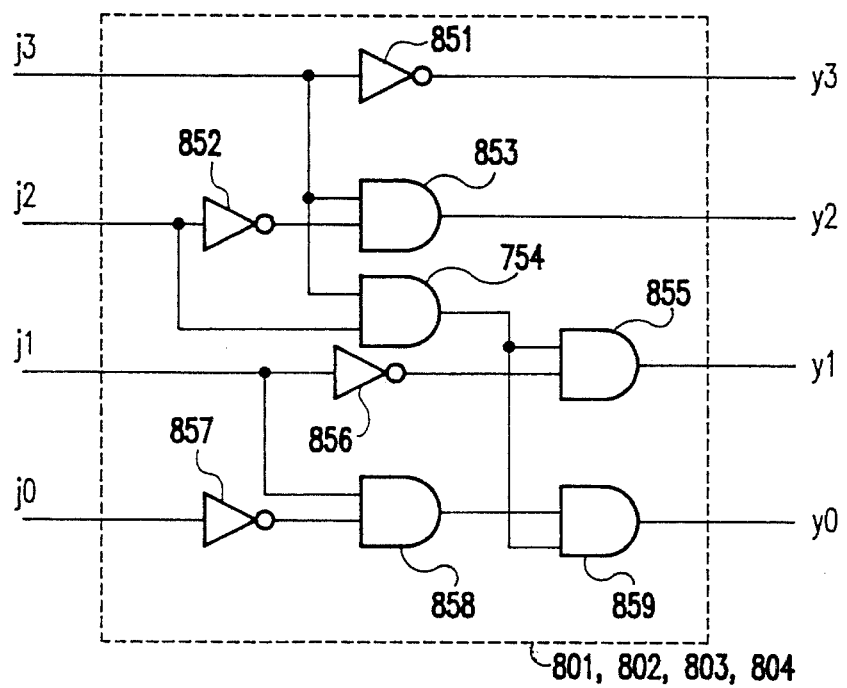
FIG. 10 is a circuit diagram of each of a 4-bit/1-detection units 801, 802, 803 and 804 shown in FIG. 6.

Turning to FIG. 10, each of the 4-bit 0-detecting sections 801 to 804 comprises inverters 851, 852, 856, and 857, and 2-input AND gates 853, 854, 855, 858 and 859, outputs 4-bits y3 to y0 for 4-bit inputs j3 to j0. The j3 is input into the inverter 851, the AND gate 853 and the AND gate 854, an output of the inverter 851 is connected to y3. The j2 is input into the inverter 852 and the AND gate 854, j1 is input into the inverter 856 and the AND gate 858, and j0 is input into the inverter 857.

A y2 is an output, from the AND gate 853, that is a logical product of j3 and an output of the inverter 852. A y1 is an output, from the AND gate 855, that is a logical product of an output, from the AND gate 854, that is further a logical product of j3 and j2 and an output of the inverter 856. A y0 is an output, from the AND gate 859, that is a logical product of an output, from the AND gate 858, that is further a logical product of j1 and an output of the inverter 857 and an output of the AND gate 854.

Figure 8:
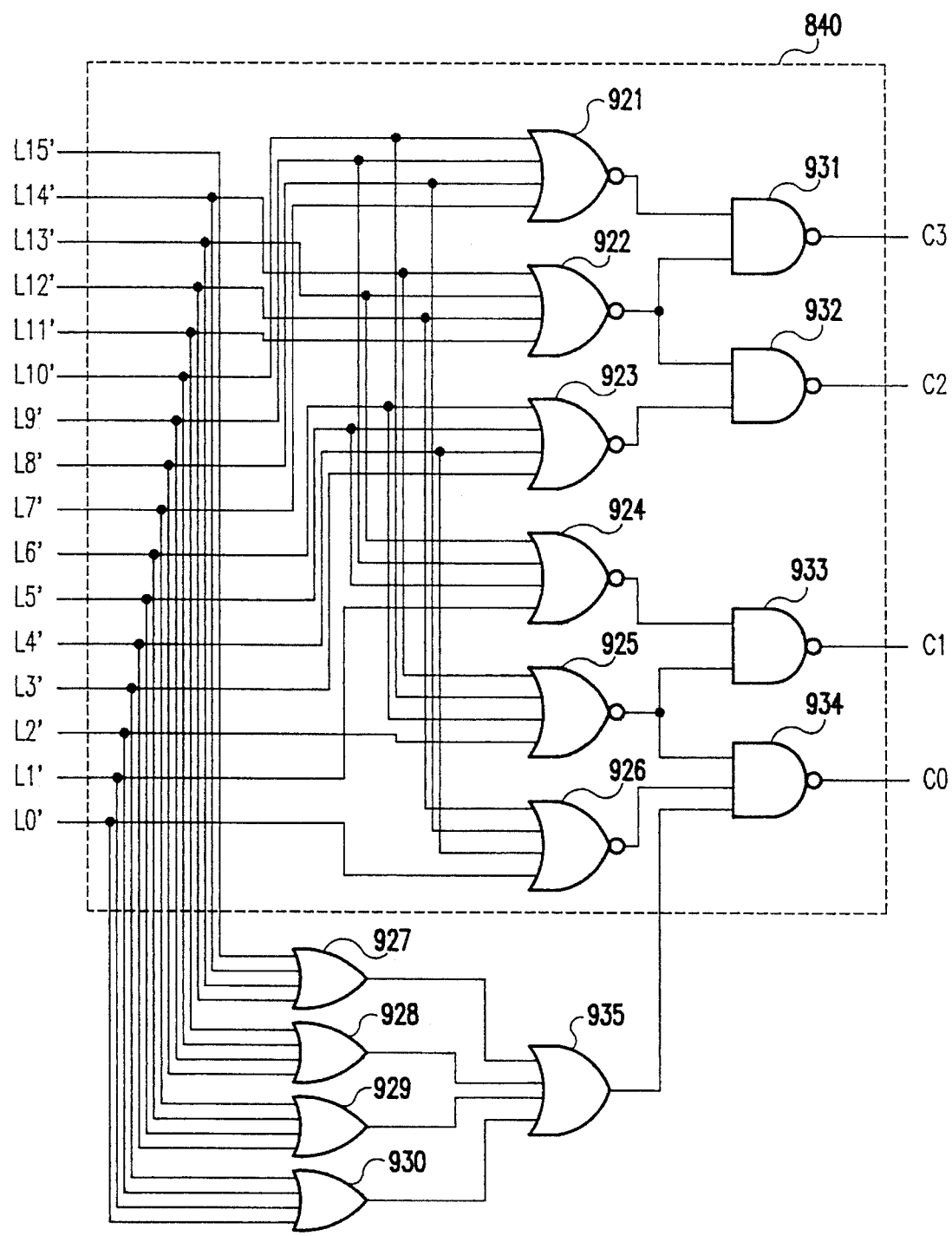
FIG. 8 is a circuit diagram of an encoder 840 shown in FIG. 6.

Referring to FIG. 8, the encoder 840 shown in FIG. 6 comprises 4-input NOR gates 921 to 926, 2-input NAND gates 931 to 933, a 3-input NAND gate 934, and 4-input OR gates 927, 928, 929, 930, and 935. The 4-input NOR gate 921 is input with L10' to L7', the 4-input NOR gate 922 is input with L14' to L11', and the 4-input NOR gate 923 is input with L6' to L3'. The 4-input NOR gate 924 is input with L13', L9', L5', and Li', the 4-input NOR gate 925 is input with L14', L0', L6', and L2', and the 4-input NOR gate 926 is input with L12', L8', L4', and L0'.

The 4-input OR gate 927 is input with L15' to L12', the 4-input OR gate 928 is input with L11' to L8', the 4-input OR gate 929 is input with L7' to L4', and the 4-input OR gate 930 is input with L3' to L0'.

Outputs of the 4-input OR gates 927, 928, 929, and 930 are further input into the 4-input OR gate 935. Outputs of the 4-input NOR gates 921 and 922 are input into the 2-input NAND gate 931, and the output therefrom to C3. Similarly, outputs of the 4-input NOR gates 922 and 923 are input into the 2-input NAND gate 932, and are output therefrom to C2.

Outputs of the 4-input NOR gates 924 and 925 are input into the 2-input NAND gate 933, and are output therefrom to C1. Outputs of the 4-input NOR gates 925 and 926 and the OR gate 935 are input into the 3-input NAND gate 934, and then are output therefrom to C0.

A difference in circuit between the encoder section 840 and the encoder 740 is in that the 4-input NOR gates 927, 928, 929, 930 and 935 are provided for detecting the timing that inputs L15' to L0' all come to zero, the encoder 740 being as described in the first embodiment.

Referring to FIG. 4, there is shown the second comparator 307 shown in FIG. 2, in which inputs two kinds of 4-bit data C and D and an output MSB of the arithmetic operation unit 301, outputs the second control signal 404. Four-bits D3 to D0 are input with 3- to 0-bits of the significant digit number 402 of the lower limit value. Four-bits C3 to C0 are input with outputs 3 to 0 bits of the second priority encoder 305.

The second comparison circuit 307 comprises a 0-bit comparison section 600 which is input of C0 and D0, a 1-bit comparison section 610 which is input with C1 and D1, a 2-bit comparison section 620 which is input of C2 and D2, a 3-bit comparison section 630 which is input of C3 and D3, and an output control section 640 which is input of MSB and a final comparison result, see FIG. 4.

Constructions of the 0-bit comparison section 600, 1 bit comparison section 610, 2-bit comparison section 620, and 3-bit comparison section 630 are the similar as those of the 0-bit comparison section 500, 1-bit comparison section 510, 2-bit comparison section 520, and 3-bit comparison section 530 in the first comparison circuit 306 in FIG. 3, hence the explanations therefor are omitted throughout.

The output control section 640 is formed of an AND gate 641 which is input of MSB and a final comparison result outputted from the 3-bit comparison section 630.

For an input/output relationship of the second priority encoder 305, in FIG. 12, input bits I15 to I0 on left-side correspond to output 16-bits of the arithmetic operation circuit 301, and output bits Q3 to Q0 on right-side correspond to inputs C3 to C0 of the second comparison circuit 307. X marks in the drawings may preferably be 1 or 0.

The second priority encoder 305 inputs an output 16-bits of the arithmetic operation circuit 301, and outputs, in 4-bits as the significant digit number, a bit on which "0" firstly appears viewed from the upper order bit.

For an input/output relationship of the second decoder 303, in FIG. 14, left-side input bits I3 to I0 correspond to 4-bits of the significant digit number 402 of the lower limit value, and right-side output bits Q15 to Q0 correspond to 16-bits outputted to the selecting circuit 308.

The second decoder 303 inputs 4-bits of the significant digit number 402 of the lower limit value and outputs negative minimum 16-bits capable of expressing by such digit number.

Description will be made below on the limiting operation for the arithmetic resultant data having a negative value. In order to facilitate the understanding of the circuit operation, the arithmetic result data is assumed to be "1101000001001001(2)" and the negative minimum or lower limit 16-bit data is assumed to be "1111111111110000(2)".

The data of "1101000001001001(2)" is supplied to the second priority encoder 305. In this circuit as shown in FIG. 6, the inputs I15 to I12 bits "1101(2)" are supplied to the 4-bit 0-detecting section 801 in FIG. 6, inputs I11 to I8 bits "0000(2)" are input into the 4-bit 0-detecting section 802, inputs I7 to I4 bits "0100(2)" are input into the 4-bit 0-detecting section 803, and inputs I3 to I0 bits "1001(2)" are input into the 4-bit 0-detecting section 804. Each 4-bit 0-detecting sections 801, 802, 803, and 804 has the same circuit construction, and obtains a logical product Of the upper order bit and the inverted signal of lower order-side bit. Hence, if "0" is on the upper order bit, the lower order bits equal to or less than such upper order bit are all masked to "0". Thus, the 4-bit 0-detecting section 801 outputs "0010(2)"; the 4-bit 0-detecting section 802 outputs "1000 (2)"; the 4-bit 0-detecting section 803 outputs "1000(2)"; and the 4-bit 0-detecting section 804 outputs "0100 (2)".

The outputs of the 4-bit 0-detecting sections 802, 803, and 804 are input into the AND gates 811 to 814, 816 to 819, and 821 to 824 respectively. Each one-side input of those AND gates is input with output values of the AND gates 805, 807, and 815 which output "0" when detecting "0" in the upper order bit. Thus, if "0" is on the upper order bit-side, the detected result of the 4-bit 0-detecting section on the lower order bit-side is masked to "0", and the result of the 4-bit 0-detecting section on the upper order bit-side is output with priority.

For example, when inputs I15 to I0 of the 0-detecting section 830 is "1101000001001001(2)" an output of 4-bit 0-detecting section 801 is "0010 (2)", and "0010000000000000(2)" is output in a form of masking the lower order 12-bits to "0". In the arrangement above, the 0-detecting section 830 outputs "1" only for a bit which firstly detects "0", and outputs "0" for the other bits, with priority of the upper order bits for 16-bit inputs I15 to I0.

The encoder 840 receives "0010000000000000(2)", where only L13' is "1", in FIG. 8 the 4-input NOR gates 922 and 924 output "0", the other 4-input NOR gates 921, 923, 925, and 926 output "1". In addition, the 4-input OR gate 927 outputs "1", the 4-input OR gates 928, 929, and 930 output "0". Therefore, an output of the 4-input OR gate 935 is "1". The output of the NOR gate 922 is input into the NAND gates 931 and 932, which output "1" to C3 and C2 respectively. The output of the NOR gate 924 is input into the NAND gate 933, which outputs "1" to C1. Inputs of the NAND gate 934 are all "1", thus the NAND gate 934 outputs "0" to C0. Therefore, outputs C3 to C0 of the encoder section 820 are "1110(2)".

In this way, the second priority encoder 305 detects "0" with priority of the upper order bit, and converts it into 4-bits representing the significant digit number for 16-bit data. For example, when input 16-bit data I15 to I0 are "1101000001001001(2)", "0" is on the 14th bit, then the second priority encoder 305 outputs "1110 (2)" as the effective digit number data of the data from the unit 301.

The second comparison circuit 307 performs the comparison operation at every bit basis sequentially from the lower order bit in respect of both 4-bit outputs "1110 (2)" of the second priority encoder 305 inputted into C3 to C0 in FIG. 4 and 4-bit "0100(2)" of the effective digit number 402 of the lower limit value inputted into D3 to D0 in FIG. 4. The 0-bit comparison section 600 outputs "1" when inputting "1" on C0 or "0" on D0, or when C0 is larger than D0. In this case (C0="1", D0="0"), the output of the 0-bit comparison section 600 is "0". The 1-bit comparison section 610 performs comparison of input C1 with input D1, where the AND gate 612 is "1" when C1 is "1" and D1 is "0" or when C1 is larger than D1. In this case, an output of the 1-bit comparison section 610 is "1".

The 2-bit comparison section 620 performs a comparison of input C2 with input D2, where the output of the OR gate 623 is "1" when the inputs C2 and D2 are equal to each other, thus the output of the 1-bit comparison section 610 being a lower order bit is, as it is, the output of the 2-bit comparison section 620. Hence, the output of the 2-bit comparison section 620 is "1".

The 3-bit comparison section 630 performs a comparison of input C3 with input D3, where the AND gate 632 is "1" when C3 is "1" and D3 is "0" or when C3 is larger than D3. Hence, the output of the 3-bit comparison section 630 is "1".

In the output control section 640, the output of the AND gate 641 is "1" due to MSB "1", then the 3-bit comparison section 630 results in the output of "1" without being masked. Thus, the second comparison circuit 307 outputs "1" as the second control signal 404 designating that an output of the second priority encoder 305 exceeds the significant digit number data 402 of the lower limit value. That is, it is denoted that the arithmetic resultant data exceeds the lower limit value.

On the other hand, the first comparison circuit 306 receives at this time the MSB of the arithmetic data that is "1", so that this comparator 306 produces the first control signal 403 taking "0".

The second decoder 303 receives the effective digit number data 402 and thus outputs "1111111111110000(2)." The significant digit number data 402 is "0100(2)". See FIG. 14.

Since the first signal 403 is at "0" and the second signal 404 is at "1", the selector 308 selects the output of the second decoder 303. Thus, the selecting circuit 308 outputs "1111111111110000(2)" as an output data. Thus, the limiting an output of the arithmetic operation circuit 301 to the predetermined lower limit value is achieved.

As hereinbefore described, the limiter system in accordance with the embodiment, in which a negative output of the arithmetic operation circuit 301 is limited by a negative maximum value represented by the significant digit number 402 of the upper limit value, is to achieve a limiting operation in accordance with a largeness comparison process using the significant digit number and therefore the limiter system of the invention is capable of a high-speed limiting operation with shortened comparison-process time with the amount corresponding to the reduced bit number, in comparison with the conventional comparison circuit performing comparative largeness decision sequentially at every bit basis.

When the arithmetic resultant data is larger than the lower limit value, it is selected and outputted.

Figure 15:
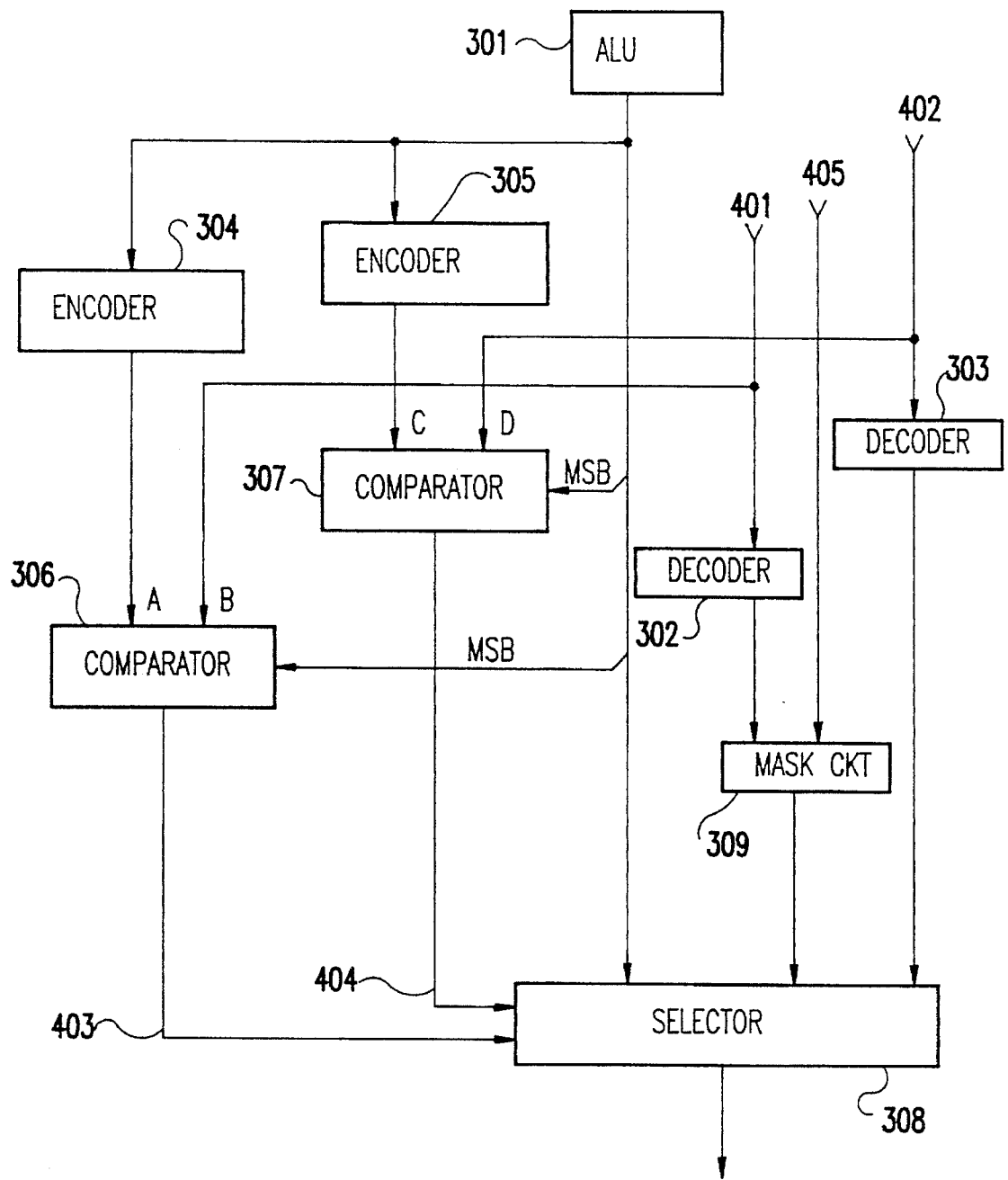
FIG. 15 is a block diagram of another embodiment of the invention.

Referring to FIG. 15, there is shown the a third embodiment according to the invention, in which the same constituents as those shown in FIG. 7 are denoted by the same reference numerals to the further description thereof.

The limiter circuit according to the present embodiment further receives a 0-mask digit number 405 designating to what digit number an output of the first decoder 302 must be masked by "0", and further includes a mask circuit 309 in which output 16-bits of the first decoder 302 are masked to a specified digit number to "0" to a specified digit number designated by the 0-mask digit number 405. The selector 308 selects one of the outputs of the arithmetic operation circuit 301 and mask circuit 309 and second decoder 303.

Turning to FIG. 16, there is shown an input/output relationship of the mask circuit 309, in which the left-side input bits I15 to I0 correspond to 16-bit data outputted from the decoder 302, I3' to I0' correspond to 4-bits of the 0-mask digit number 405, and right-side output bits Q15 to Q0 correspond to 16-bits outputted to the selecting circuit 308. The mask circuit 309 inputs 16-bit data outputted from the first decoder 302 and 4-bits of the 0-mask digit number 405, and outputs 16-bit data whose digit number equal to or less than those shown by 4-bits of the 0-mask digit number 405 have been masked to "0" for 16-bit output of the first decoder 302.

The following explanation is for the limiting operation wherein a positive maximum value of output of the first decoder 302 is output by "0"-masking a bit equal to or less than the digit number designated by the 0-mask digit number 405 when an output of the arithmetic operation circuit 301 exceeds positive maximum 16-bit data expressed by the significant digit number 401 of the upper limit value.

For a concrete explanation, an example of the circuit operation is provided in which the selecting circuit 308 limits an output of the arithmetic operation circuit 301, positive maximum 16-bit data "0000000000001111(2)" expressed by the significant digit number 401 of the upper limit value is output, and "0000000000001100(2)" masked to "0" for a bit equal to or less than the digit number designated by the 0-mask digit number 405 is output, where an output of the arithmetic operation circuit 301 is 16-bit positive integer "0010000001001001(2)", the significant digit number 401 of a predetermined upper limit value is "0100(2)", and the 0-mask digit number 405 is "0010(2)".

When an output of the arithmetic operation unit 301 is "0010000001001001(2)", similarly to the first embodiment, the first priority encoder 304 outputs "1110(2)" as the significant digit number. The first comparison circuit 306 inputs an output "1110(2)" of the first priority encoder 304 and 4-bits "0100(2)" of the significant digit number 401 of the upper limit value, and outputs "1" as a comparison result as a first control signal 403.

In the second comparison circuit 307, a largeness comparison result is masked to "0" because an output of the arithmetic operation circuit 301 has MSB "0", then the second comparison circuit 307 outputs "0" as a second control signal 404.

The first decoder 302 outputs "0000000000001111(2)" for the significant digit number 401 "0100(2)" of the upper limit value, see FIG. 13.

The mask circuit 309, when the 0-mask digit number 405 is "0010(2)", outputs "0000000000001100(2)" in which those equal to or less than 2th bit of output "0000000000001111(2)" of the first decoder 302 are masked to "0", see FIG. 16.

The selecting circuit 308 selects an output of the mask circuit 309 because the first control signal 403 being a selecting signal is made "1" and the second control signal 404 is made "0". Thus, the selecting circuit 308 outputs "0000000000001100(2)" and is capable of limiting an output of the arithmetic operation circuit 301.

As hereinbefore described, the limiter system in accordance with the embodiment, in which a positive output of the arithmetic operation circuit 301 is limited by a positive maximum value expressed by the significant digit number 401 of the upper limit value, is to achieve a limiting operation in accordance with a largeness comparison process using the significant digit number and therefore the limiter system of the invention is capable of high-speed limiting operation with shortened comparison-process time in the amount proportional to the reduced bit number, in comparison with the conventional comparison circuit performing comparative largeness decision sequentially at every bit basis. In this embodiment, "0" mask is provided for those equal to or less than the digit number designated by the 0-mask digit number 405 with respect to an output of the first decoder 302, then even when a guarantee for "0" is required for those equal to or less than a specified bit from among outputs of the arithmetic operation circuit, hence the limiting operation is achieved.

In the conventional limiter apparatus, the comparison circuit is used for determining a largeness decision sequentially at every bit basis from least significant bit to most significant bit. For example, when using the 16-bit comparison circuit having the same construction as the 4-bit comparison circuit which has been explained in the embodiments, a delay time in the amount corresponding to 32 gates (the 0-bit comparison section gate number x 16-bit in FIG. 3) is required before the comparison result is output.

In contrast, the embodiments of the invention only require, for example, a delay time in the amount corresponding to a total amount of 17 gates made of 9 gates in the first comparison circuit 306 of 4-bit input (the inverter 501, AND gate 502, AND gate 514, OR gate 515, AND gate 524, OR gate 525, AND gate 534, OR gate 535, and AND gate 542 in FIG. 3), and 8 gates in the priority encoder 304 (the inverter 857, AND gate 858, AND gate 859, in FIG. 10, the AND gate 819, AND gate 828, in FIG. 6, and the OR gate 930, OR gate 935, and NAND gate 934, in FIG. 8). Therefore, the embodiment of the invention reduces by about ½ of the conventional example.

A gradient of decrease of the delay time is more notable with a larger bit range. For example, when using 32-bit comparison circuit for performing a largeness decision sequentially at every bit basis from the least significant bit to the most significant bit, the embodiment according to the invention only requires a delay time in the amount corresponding to a total amount of 21 gates made of 11 gates in the 5-bit comparison circuit and 10 gates in the priority encoder, reducing to about ⅓ in comparison with the conventional comparison circuit requiring the delay time in the amount corresponding to 64 gates.

The present invention has been described with reference to the embodiments as above. However, the invention is not limited to such preferred embodiments, various modification in accordance with the principle of the present invention may be taken therein without departing from the spirit of the invention. For example, the present invention may therefore be applied to an arrangement in which positive values are employed for both the upper limit value and the lower limit value, or negative values are employed for both the upper limit value and the lower limit value. In the embodiments, the circuit diagrams shown for such embodiments are solely the construction examples respectively. Such is the case, in the present invention, the other equivalent circuit constructions may be taken therein without departing from the scope of the invention.

In effect and advantage, as hereinbefore fully described, the limiter system according to the present invention is capable of achieving a high-speed signal processing using a high-speed data cut-off operation with a high-speed output operation of data within a range between the upper limit value and the lower limit value by shortening the comparison processing time in the amount in proportion to the reduced bit number by comparing the significant digit number of the data with the significant digit number of a limit value, in comparison with the conventional comparison circuit performing a largeness comparison sequentially at every bit basis from the least significant bit for the most significant bit.

The present invention is to suppress and reduce the delay time increase in processing when employing an increased bit-range, unlike the conventional example wherein the delay time is increased with a more bit-range because of employing the comparison circuit which performs a largeness comparison sequentially at every bit basis from the least significant bit to the most significant bit.

More quantitatively, in the conventional example, when performing a largeness comparison sequentially at every bit basis in the 16-bit comparison circuit, a delay time in the amount corresponding to 32 gates (0-bit comparison section gate number x 16-bits in FIG. 3) is required before a comparison result is output. According to the present invention, for example, a delay time corresponds to a total amount of 17 gates made of 9 gates in the first comparison circuit 306 of 4-bit inputs and 8 gates in the priority encoder 304, thus the invention may reduce the delay time by about ½ of the conventional example.

In the conventional comparison circuit, when using the 32-bit comparison circuit performing a largeness comparison sequentially at every bit basis from the least significant bit to the most significant bit a delay time in the amount corresponding to 64 bits is required. On the other hand, according to the invention, the required delay time is only to correspond to a total amount of 21 gates made of 11 gates in the 5-bit comparison circuit and 10 gates in the priority encoder, the delay time is reduced to ⅓ of the conventional one. Therefore, the present invention exhibits a more notable suppression and reduction effect of the delay time with the increase of the bit range of data, and achieves a large improvement in a processing speed of a high-speed signal processor for the 16-bit or 32-bit range data.

Further in the present invention, those equal to or less than the digit number designated by the 0-mask digit number for the first decoder output are masked to "0", thus the limiting operation can be performed at a high speed even when guaranteeing realization of "0" for those equal to or less than a specified bit in respect of the arithmetic operation circuit.

It is apparent that the present invention is not limited to the above embodiments but may be changed and modified without departing from the scope and spirit of the invention. For example, when the arithmetic unit 301 only produces a positive data and the data thus produced in required to be subjected to a limiting operation by a certain range, it can be constructed that the comparator 307 receives the output of the encoder 304 and the effective digit number data indicative of a positive lower limit value is used as the data 402.

What is claimed is:

1. A limiter circuit for limiting a value of an input data to a first limit value when the value of said input data exceeds said limit value, comprising a first encoder responding to said input data and producing a first data indicative of an effective digit number of the value of said input data, first means for receiving a second data indicative of an effective digit number of said first limit value, a first comparator comparing said first data with said second data and producing a first comparison output signal, a first decoder decoding said second data and producing a third data indicative of said limit value, and a selector selecting and outputting one of said input data and said third data in response to said first comparison output signal.

2. The limiter circuit as claimed in claim 1, further comprising second means for receiving a fourth data indicative of an effective digit number of a second limit value, a second comparator comparing a fifth data indicative of the effective digit number of the value of said input data with said fourth data to produce a second comparison output signal, and a second decoder decoding said fourth data and producing a sixth data indicative of said second limit value, said selector selecting one of said input data, said third data and said sixth data in response to said first and second comparison output signal.

3. The limiter circuit as claimed in claim 2, wherein said first encoder produces said first data when said input data has a positive value and said third means comprises a second encoder producing said fifth data when said input data has a negative value.

4. A limiter circuit for producing an output data within a range between an upper limit value and a lower limit value, comprising:

a first priority encoder outputting a first data indicative of an effective digit number of an input data when said input data has a positive value;

a second priority encoder outputting a second data indicative of an effective digit number of said input data when said input data has a negative reduce;

a first comparator comparing said first data with a third data indicative of an effective digit number of said upper limit value and producing a first control signal;

a second comparator comparing said second data with a fourth data indicative of an effective digit number of said lower limit value and producing a second control signal;

a first decoder responding to said third data and producing a fifth data indicative of said upper limit value;

a second decoder responding to said fourth data and producing a sixth data indicative of said lower limit value; and a selector selecting and outputting one of said input data, said fifth data and said sixth data in response to said first and second control signals.

5. A limiter circuit for outputting data within a range between an upper limit value and a lower limit value, comprising:

a first priority encoder producing a first data indicative of an effective digit number of input data having a positive value;

a second priority encoder producing a second data indicative of an effective digit number of input data having a negative value;

a first comparator comparing said first data with a third data indicative of an effective digit number of said upper limit value;

a second comparator comparing said second data with a fourth data indicative of an effective digit number of said lower limit value;

a first decoder producing a fifth data indicative of said upper limit value in response to said third data;

a second decoder producing a sixth data indicative of said lower limit value in response to said fourth data;

a mask circuit receiving said fifth data and mask data and producing a seventh data which is derived by masking a part of said fifth data designated by said mask data; and a selector selecting and outputting one of said input data, said sixth data and said seventh data in response to output signals of said first and second comparators.

* * * * *